(12) United States Patent
Atsuta et al.

(10) Patent No.: US 7,728,301 B2
(45) Date of Patent: Jun. 1, 2010

(54) X-RAY DETECTOR

(75) Inventors: Masaki Atsuta, Yokosuka (JP); Yujiro Hara, Yokohama (JP); Hideyuki Nakao, Setagaya-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/397,746

(22) Filed: Mar. 4, 2009

(65) Prior Publication Data

US 2009/0242781 A1      Oct. 1, 2009

(30) Foreign Application Priority Data

Mar. 25, 2008   (JP) .............................. 2008-077856

(51) Int. Cl.
   *G01T 1/24*   (2006.01)
(52) U.S. Cl. ................. 250/370.09; 250/370.12; 250/370.13
(58) Field of Classification Search .......... 250/370.09, 250/370.12, 370.13
   See application file for complete search history.

(56) References Cited

U.S. PATENT DOCUMENTS 7,145,986 B2 *  12/2006  Wear et al. .................. 378/98.8

2005/0023474 A1 *  2/2005  Persyk et al. ............. 250/370.1

FOREIGN PATENT DOCUMENTS

JP       5-21353 B2     3/1993

OTHER PUBLICATIONS

R. Ohno, "Recent state of CdTe-based radiation detectors", Hoshasen, vol. 30, No. 1, 2004, pp. 1-11.

* cited by examiner

*Primary Examiner*—Constantine Hannaher
(74) *Attorney, Agent, or Firm*—Oblon, Spivak, McClelland, Maier & Neustadt, L.L.P.

(57) ABSTRACT

An X-ray detector includes: a semiconductor substrate to generate charged particles by an irradiation of an X-ray; a plurality of pixel electrodes arranged in matrix on an X-ray incident surface of the semiconductor substrate and applied with a first electric potential to detect the charged particles; and a platy electrode provided on a surface opposite to the X-ray incident surface of the semiconductor substrate and applied with a second electric potential different from the first electric potential.

14 Claims, 5 Drawing Sheets

X-RAY DETECTOR

CROSS-REFERENCE TO RELATED APPLICATIONS

This application is based upon and claims the benefit of priority from the prior Japanese Patent Application No. 2008-077856, filed on Mar. 25, 2008; the entire contents of which are incorporated herein by reference.

BACKGROUND OF THE INVENTION

1. Field of the Invention

The present invention relates to an X-ray detector preferably usable for medical computer tomography (X-ray CT) and the like requiring particularly high time resolution and spatial resolution.

2. Description of the Related Art

Recently, X-ray computer tomography (X-ray CT) is employed for the diagnosis of an internal organ which beats extremely fast such as a heart. In order to photograph finely such an internal organ as beating extremely fast, a detector satisfying high time resolution and high spatial resolution is required.

At present, an indirect conversion type X-ray detector, which converts an X-ray into a visible light once by a scintillator and then, converts the visible light into the corresponding electric signal, is mainly employed for the X-ray computer tomography. In the indirect conversion type X-ray detector, however, the enhancement of the time resolution is pushed to the limit due to the afterglow of the scintillator. In this point of view, such a direct conversion type X-ray detector as directly converting an X-ray with semiconductor is proposed instead of the indirect conversion type X-ray detector (Reference 1).

The direct conversion type X-ray detector in Reference 1 is configured such that a platy electrode is formed on the X-ray incident surface of a CdTe semiconductor substrate and a plurality of pixel electrodes are arranged on the rear surface of the semiconductor substrate opposite to the X-ray incident surface thereof, and a signal reading circuit (CMOS) with electrode pads electrically connected with the pixel electrodes respectively via soldering portions is provided.

In the direct conversion type X-ray detector, the charged particles (electrons and holes) caused by the incidence of an X-ray onto the semiconductor substrate are detected at the pixel electrodes under the condition that a constant biasing voltage is applied between the platy electrode and the pixel electrodes, and read out at the signal reading circuit. Since the amount of the charged particles detected at the pixel electrodes is proportional to the intensity of the incident X-ray, the incident position into the X-ray detector can be known by measuring the amount of the charged particles, that is, the amplitude of the electric signal corresponding to the charged particles per pixel electrode.

With the direct conversion type X-ray detector, however, the X-ray can not be often detected in high spatial resolution in dependence on the intensity of the X-ray and the like.

[Reference 1] Radiation, Vol. 30, No. 1, p1 (2004)

BRIEF SUMMARY OF THE INVENTION

An aspect of the present invention relates to an X-ray detector, including: a semiconductor substrate to generate charged particles by an irradiation of an X-ray; a plurality of pixel electrodes arranged in matrix on an X-ray incident surface of the semiconductor substrate and applied with a first electric potential to detect the charged particles; and a platy electrode provided on a surface opposite to the X-ray incident surface of the semiconductor substrate and applied with a second electric potential different from the first electric potential.

In an X-ray detector as taught in Reference 1, the pixel electrodes for detecting charged particles (electrons and holes) are provided on the rear surface of the semiconductor substrate opposite to the X-ray incident surface. When the X-ray is incident onto the semiconductor substrate, the thus generated charged particles, that is, electrons and holes are diffused in the thickness direction of the semiconductor substrate and diffused laterally in the semiconductor substrate due to the thickness of the semiconductor substrate. Such an inclination becomes conspicuous as the intensity of the X-ray is increased and the thickness of the semiconductor substrate is increased.

Therefore, the electrons and holes are flowed in the pixel electrodes corresponding to the irradiating position of the X-ray and the adjacent pixel electrodes not corresponding to the irradiating position of the X-ray. As a result, some noises such as cross talk and the like are generated so as to deteriorate the spatial resolution of the X-ray detector.

On the other hand, the concentration of the charged particles (electrons and holes) becomes higher near the X-ray incident surface of the semiconductor substrate and becomes lower near the rear surface thereof because the concentration of the charged particles is decreased remarkably in the thickness direction. As a result, if the pixel electrodes are provided on the X-ray incident surface of the semiconductor substrate, the charged particles generated by the irradiation of the X-ray can be detected effectively and efficiently.

Moreover, since the charged particles generated at the X-ray incident surface are detected by the pixel electrodes, the detection of the charged particles can not be affected by the lateral diffusion of the charged particles accompanied by the longitudinal direction of the charged particles along the thickness direction of the semiconductor substrate. Therefore, the pixel electrodes can detect the charged particles only generated at the corresponding incident position of the X-ray of the semiconductor substrate As a result, the pixel electrodes can detect the large amount of the charged particles generated by the irradiation of the X-ray so that the spatial resolution of the X-ray detector can be enhanced. In contrast, in a conventional X-ray detector, since the pixel electrodes are provided on the rear surface of the semiconductor substrate, the detection of the charged particles by the pixel electrodes is affected by the lateral diffusion of the charged particles.

In an embodiment, the X-ray detector further includes: a plurality of condensers electrically connected with the plurality of pixel electrodes, respectively; and a plurality of semiconductor switching elements electrically connected with the plurality of condensers, respectively. In this case, the pixel electrodes, the condensers and the semiconductor switching elements constitute a signal reading circuit for the charged particles detected at the pixel electrodes. Therefore, no external reading circuit is not required so that the entire structure of the X-ray detecting device containing the X-ray detector can be simplified.

However, wirings may be provided for the pixel electrodes so that the charged particles detected at the pixel electrodes can be read out at a given external reading circuit.

In another embodiment, the X-ray detector further includes a plurality of collimators above the X-ray incident surface of the semiconductor substrate between adjacent ones of the plurality of pixel electrodes. In this case, since the irradiating area of the X-ray can be changed by the collimators, the selectivity of X-ray irradiation can be imparted to the pixel electrodes. Namely, the pixel electrodes for the X-ray to be irradiated can be appropriately selected.

In still another embodiment, the condenser is made of a stacking structure of a first metallic film/an insulating film/a second metallic film which are formed on the X-ray incident surface of the semiconductor substrate. In this case, the condenser function can be simply imparted to the X-ray detector.

In a further embodiment, the collimator contains a stacking structure of a first metallic film/an insulating film/a second metallic film to constitute the condenser so that the condenser is contained in the collimator. In this case, the condenser function can be simply imparted to the X-ray detector. Furthermore, since no condenser is provided on the semiconductor substrate, the pixel electrodes can be arranged and integrated on the semiconductor substrate in high density so that the spatial resolution of the X-ray detector can be much enhanced.

In a still further embodiment, the semiconductor switching elements contains a semiconductor element substrate, a gate insulating film and a gate electrode which are formed on the X-ray incident surface of the semiconductor substrate. In this case, the gate electrode may be located below the gate insulating film and the semiconductor element substrate may be located above the gate insulating film. Therefore, the structure of the semiconductor switching element can be simplified so that the manufacturing cost of the X-ray detector can be reduced.

In another embodiment, a surface level of one of the first metallic film and the second metallic film of the condenser is set equal to a surface level of the gate electrode of the semiconductor switching element. In this case, since one of the first metallic film and the second metallic film and the gate electrodes 241 can be formed at the same manufacturing step so that the manufacturing process of the X-ray detector can be simplified and the manufacturing cost of the X-ray detector can be reduced.

In this embodiment, a surface level of the other of the first metallic film and the second metallic film of the condenser is set equal to a surface level of the pixel electrodes. In this case, since the other of the first metallic film and the second metallic film and the pixel electrodes can be formed at the same manufacturing step so that the manufacturing process of the X-ray detector can be simplified and the manufacturing cost of the X-ray detector can be reduced.

In a still another embodiment, the semiconductor switching elements are arranged between the semiconductor substrate and the plurality of collimators. In this case, since the semiconductor switching elements can be shielded by the collimators against the X-ray incident onto the semiconductor substrate, no charged particle is generated in the semiconductor switching elements and thus, no leak current is generated in the semiconductor switching elements so that the spatial resolution of the X-ray detector can not be degraded due to the detection of leak current at the pixel electrodes.

In a further embodiment, the semiconductor switching elements are electrically connected with the collimators, respectively so that the collimators function as signal wires for the semiconductor switching elements. In the case that the condensers and the semiconductor switching elements are incorporated into the X-ray detector to form the signal reading circuit, signal wires are additionally required. The line width of a normal signal wire is in the order of several ten μm and the width of the collimator is in the order of several hundred μm. Therefore, the resistance of the collimator becomes remarkably small in comparison with the resistance of the normal signal wire. In this point of view, if the collimators are employed as the signal wires of the signal reading circuit, the degradation of the detection signal can be suppressed.

DETAILED DESCRIPTION OF THE INVENTION

Hereinafter, the present invention will be described in detail with reference to the drawings.

First Embodiment

Figure 1:
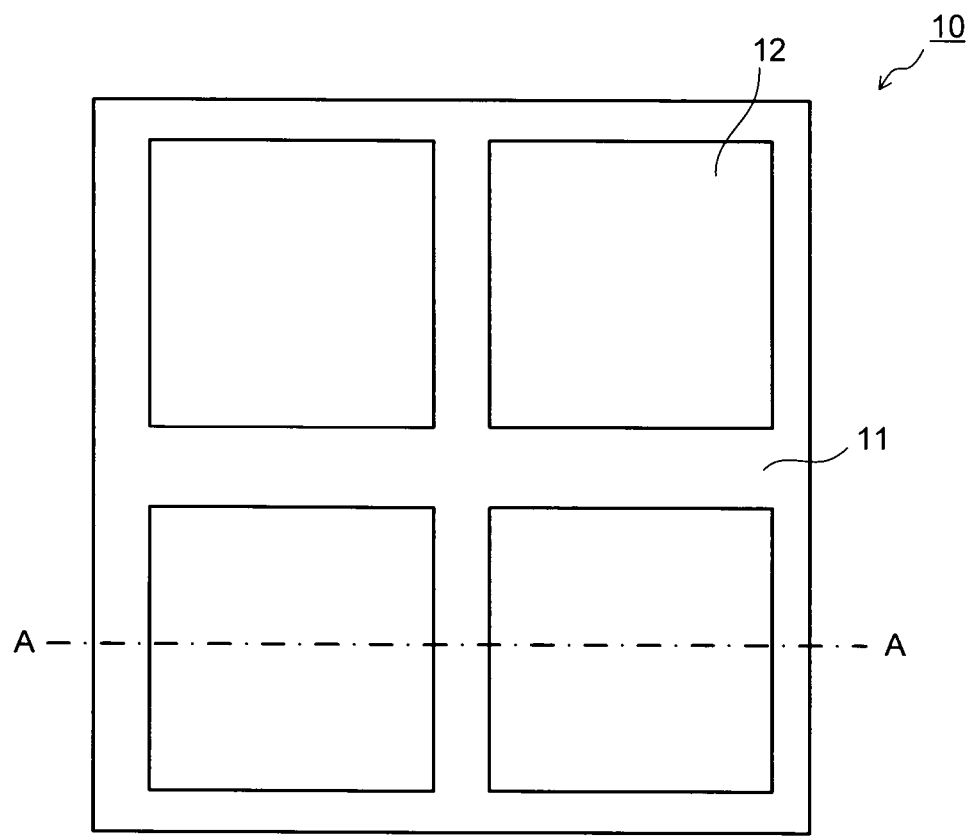
FIG. 1 is a plan view showing an X-ray detector according to a first embodiment.
Figure 2:
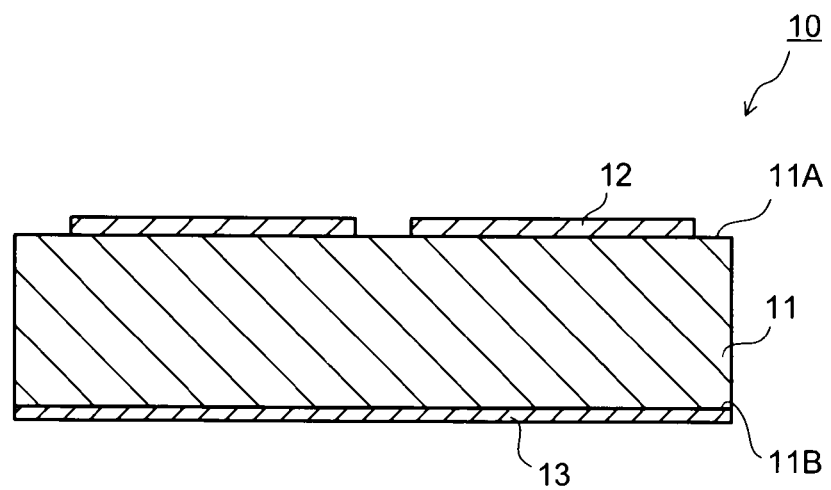
FIG. 2 is a cross sectional view of the X-ray detector in FIG. 1, taken on line A-A thereof.
Figure 3:
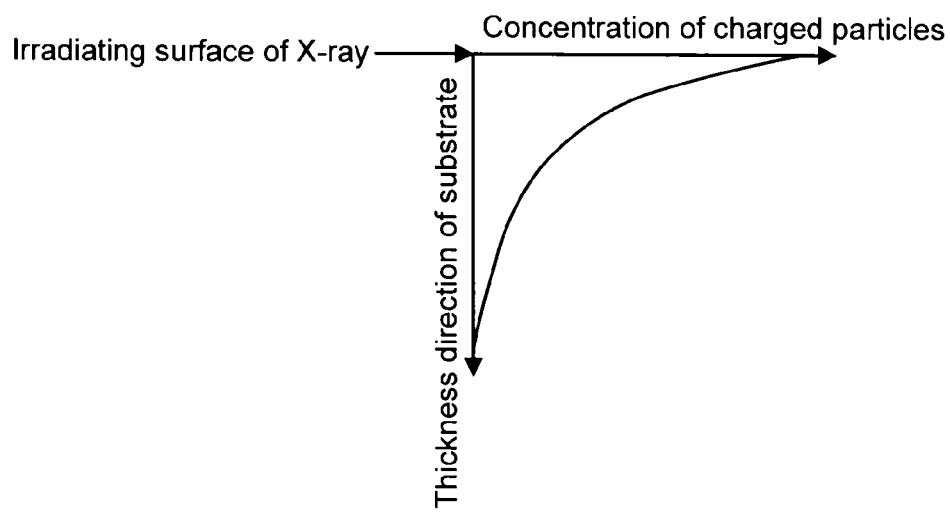
FIG. 3 is a schematic view showing the state of charged particles generated when an X-ray is incident on the X-ray incident surface of the X-ray detector shown in FIGS. 1 and 2.

FIGS. 1 and 2 are structural views showing an X-ray detector according to a first embodiment. FIG. 1 is a plan view showing the X-ray detector, and FIG. 2 is a cross sectional view showing the X-ray detector in FIG. 1, taken on line A-A thereof. FIG. 3 is a schematic view showing the state of charged particles generated when an X-ray is incident on the X-ray incident surface of the X-ray detector shown in FIGS. 1 and 2. For clarifying the distinctive feature of the X-ray detector in this embodiment, attention is paid to a portion of the X-ray detector in FIGS. 1 and 2.

As shown in FIGS. 1 and 2, the X-ray detector 10 in this embodiment includes a semiconductor substrate 11, a plurality of pixel electrodes 12 arranged in matrix on the X-ray incident surface 11A of the semiconductor substrate 11 and a platy electrode 13 provided on the rear surface 11B of the semiconductor substrate 11 opposite to the X-ray incident surface 11A thereof. Not shown wirings are connected with the pixel electrodes 12 respectively and electrically connected with an external reading circuit (not shown).

The semiconductor substrate 11 is made of a semiconductor material with high X-ray absorbency such as CdTe, amorphous Se, $PbI_2$ and PbO. The pixel electrodes 12 and the platy electrode 13 are made of an electrode material commercially available such as Au, Pt, Al and In. The pixel electrodes 12 may be formed as follows. First of all, an electrode material is deposited on the X-ray incident surface 11A and patterned by means of photolithography. Alternatively, a pattern mask is formed on the X-ray incident surface 11A and the electrode material is deposited via the pattern mask.

When an X-ray is incident onto the X-ray incident surface 11A of the semiconductor substrate 11, the X-ray excites the semiconductor elements of the semiconductor substrate 11 to generate charged particles (electrons and holes) in the semiconductor substrate 11. In this case, the concentration of the charged particles becomes higher near the X-ray incident surface 11A and becomes lower near the rear surface 11B because the concentration of the charged particles is decreased remarkably in the thickness direction (toward the rear surface 11B from the X-ray incident surface 11A of the semiconductor substrate 11).

In this embodiment, since the pixel electrodes 12 are provided on the X-ray incident surface 11A of the semiconductor substrate 11, that is, at the incident side of the X-ray, the charged particles generated at the incident side of the X-ray, that is, on the X-ray incident surface 11A can be detected effectively and efficiently by the irradiation of the X-ray. Moreover, since the charged particles are detected at the incident side of the X-ray by the pixel electrodes 12, the detection of the charged particles can not be affected by the lateral diffusion of the charged particles accompanied by the longitudinal direction of the charged particles along the thickness direction of the semiconductor substrate 11. Therefore, since the pixel electrodes 12 can detect the charged particles only generated at the corresponding incident position of the X-ray of the semiconductor substrate 11, the spatial resolution of the X-ray detector 10 can be enhanced. In contrast, in a conventional X-ray detector 10, since the pixel electrodes 12 are provided on the rear surface 12B of the semiconductor substrate 12, the detection of the charged particles by the pixel electrodes 12 is affected by the lateral diffusion of the charged particles.

Herein, in the case that the charged particles are detected at the pixel electrodes 12, a predetermined biasing voltage is applied between the pixel electrodes 12 and the platy electrode 13.

Second Embodiment

Figure 4:
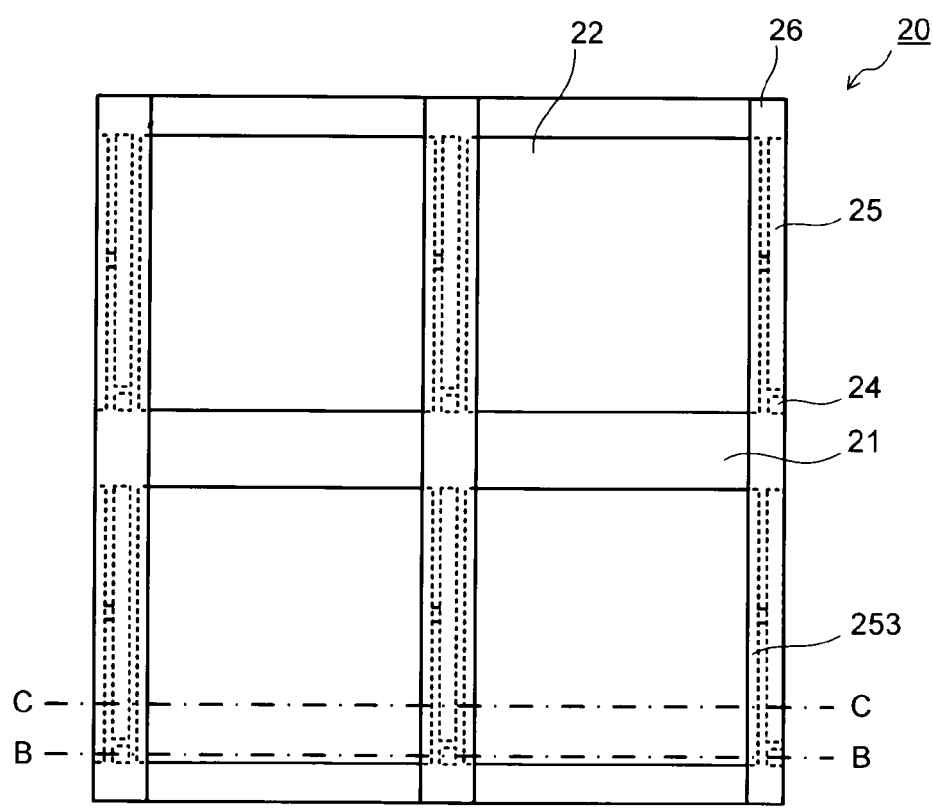
FIG. 4 is a plan view showing an X-ray detector according to a second embodiment.
Figure 5:
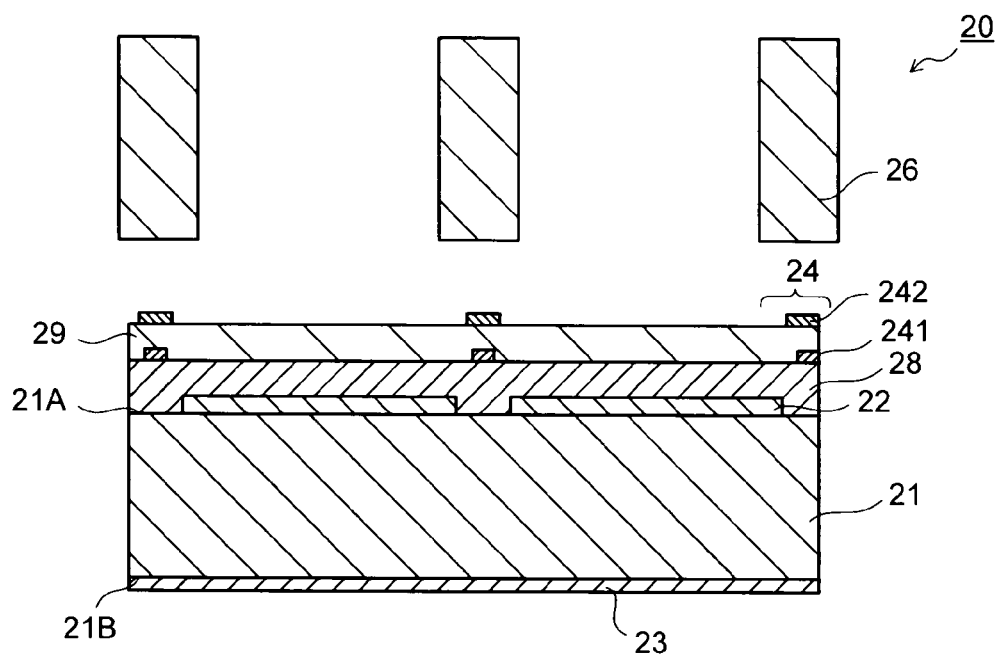
FIG. 5 is a cross sectional view of the X-ray detector in FIG. 4, taken on line B-B thereof.
Figure 6:
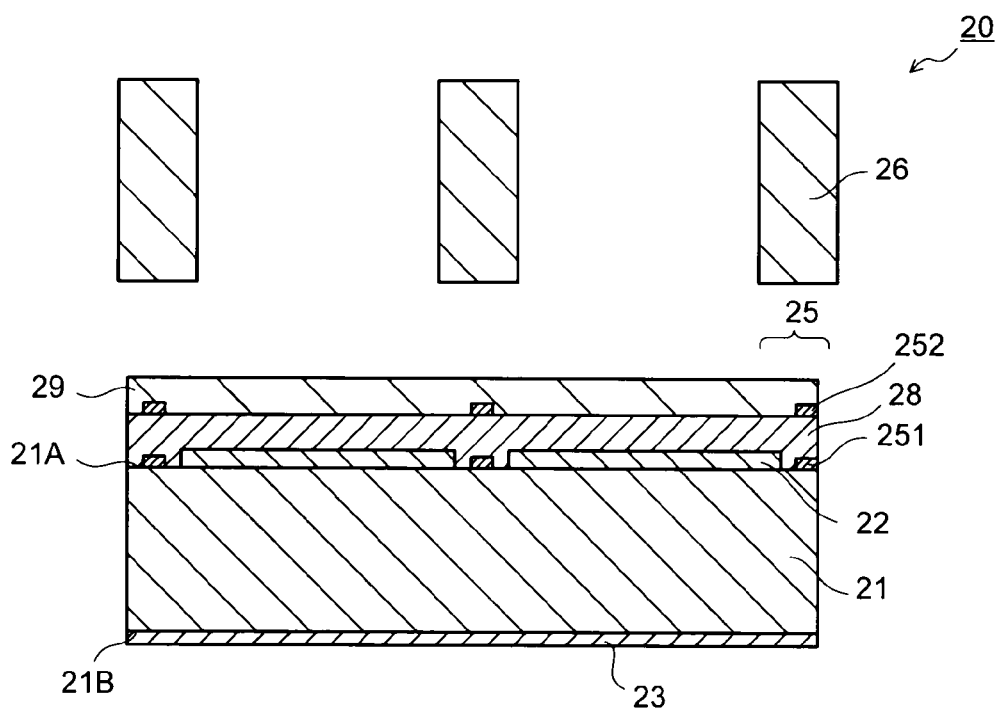
FIG. 6 is a cross sectional view of the X-ray detector in FIG. 4, taken on line C-C thereof.

FIGS. 4 to 6 are schematic structural views showing an X-ray detector according to a second embodiment. FIG. 4 is a plan view showing the X-ray detector in this embodiment, and FIG. 5 is a cross sectional view showing the X-ray detector in this embodiment, taken on line B-B thereof, and FIG. 6 is across sectional view showing the X-ray detector in this embodiment, taken on line C-C thereof.

For clarifying the distinctive feature of the X-ray detector in this embodiment, the sizes of the components of the X-ray detector shown in FIG. 4 are different from the sizes of the components of the X-ray detector shown in FIGS. 5 and 6.

As shown in FIGS. 4 to 6, the X-ray detector 20 in this embodiment includes a semiconductor substrate 21, a plurality of pixel electrodes 22 arranged in matrix on the X-ray incident surface 21A of the semiconductor substrate 21 and a platy electrode 23 provided on the rear surface 21B of the semiconductor substrate 21 opposite to the X-ray incident surface 21A thereof. A plurality of collimators 26 are disposed above the X-ray incident surface 21A and located between the adjacent pixel electrodes 22.

Then, a first insulating film 28 and a second insulating film 29 are subsequently formed on the X-ray incident surface 21A of the semiconductor substrate 21 so as to cover the pixel electrodes 22.

As shown in FIG. 5, a plurality of gate electrodes 241 are formed on the first insulating film 28 and a plurality of semiconductor element substrates 242 are formed on the second insulating film 29. In this case, portions of the second insulating film 29 located between the gate electrodes 241 and the semiconductor element substrates 242 function as gate insulating films. Therefore, the combinations of the gate electrodes 241, the second insulating film 29 and the semiconductor element substrates 242 constitute transistors as semiconductor switching elements 24, respectively. As apparent from FIGS. 4 and 5, in this embodiment, the semiconductor switching element 24 is provided per pixel electrode 22.

As shown in FIG. 6, a plurality of first metallic films 251 are formed on the x-ray incident surface 21A of the semiconductor substrate 21, and a plurality of metallic films 252 are formed on the first insulating film 28. Therefore, the combinations of the first metallic films 251, the first insulating film 28 and the second insulating film 29 constitute condensers 25, respectively. The first metallic films 25 are electrically connected with the pixel electrodes 22 adjacent there to via wirings 253 so that the condenser 25 can be provided per pixel electrode 22, as shown in FIGS. 4 and 6.

The semiconductor substrate 21 is made of a semiconductor material with high X-ray absorbency such as CdTe, amorphous Se, $PbI_2$ and Pbo. The pixel electrodes 12 and the platy electrode 13 are made of an electrode material commercially available such as Au, Pt, Al and In. The first insulating film 28 and the second insulating film 29 may be made of an insulating material such as silicon oxide, silicon nitride, silicon oxynitride, aclylitic resin, benzocyclobutene resin. The semiconductor element substrates 242 may be made of a semiconductor material such as amorphous silicon, polycrystalline silicon, single-crystal silicon, inorganic semiconductor compound and organic semiconductor compound. With the amorphous silicon, the semiconductor element substrates 242 maybe formed at a temperature of 400° C. or less by means of plasma CVD. With the polycrystalline silicon, the semiconductor element substrates 242 may be formed by annealing the amorphous silicon with an excimer laser. In this case, since the carrier mobility of the polycrystalline silicon film becomes larger than the carrier mobility of the amorphous silicon film, the size of the semiconductor element substrate 242 made of the polycrystalline silicon can be downsized in comparison with the size of the semiconductor element substrate 242 made of the amorphous silicon.

When an X-ray is incident onto the X-ray incident surface 21A of the semiconductor substrate 21, the X-ray excites the semiconductor elements of the semiconductor substrate 21 to generate charged particles (electrons and holes) in the semiconductor substrate 21. In this case, as shown in FIG. 3, the concentration of the charged particles becomes higher near the X-ray incident surface 21A and becomes lower near the rear surface 21B because the concentration of the charged particles is decreased remarkably in the thickness direction (toward the rear surface 21B from the X-ray incident surface 21A of the semiconductor substrate 21).

In this embodiment, since the pixel electrodes 22 are provided on the X-ray incident surface 21A of the semiconductor substrate 21, that is, at the incident side of the X-ray, the charged particles generated at the incident side of the X-ray, that is, on the X-ray incident surface 21A can be detected effectively and efficiently by the irradiation of the X-ray. Moreover, since the charged particles are detected at the incident side of the X-ray by the pixel electrodes 22, the detection of the charged particles can not be affected by the lateral diffusion of the charged particles accompanied by the longitudinal direction of the charged particles along the thickness direction of the semiconductor substrate 21. Therefore, since the pixel electrodes 22 can detect the charged particles only generated at the corresponding incident position of the X-ray of the semiconductor substrate 21, the spatial resolution of the X-ray detector 20 can be enhanced. In contrast, in a conventional X-ray detector 20, since the pixel electrodes 22 are provided on the rear surface 22B of the semiconductor substrate 22, the detection of the charged particles by the pixel electrodes 22 is affected by the lateral diffusion of the charged particles.

In this embodiment, since the condenser 25 is provided per pixel electrode 22, the charged particles detected at the pixel electrode 22 is charged in the corresponding condenser 25. Thereafter, the corresponding semiconductor switching element 24 is switched on (a predetermined gate voltage is applied to the corresponding gate electrode 241) so that the charged particles charged in the corresponding condenser 25 are taken out via a wiring (not shown) and read out. Therefore, the combination of the pixel electrodes 22, the semiconductor switching elements 24 and the condensers 25 constitute a signal reading circuit.

In this point of view, the X-ray detector 20 in this embodiment does not require an external reading circuit so that the entire structure of the X-ray detecting device containing the X-ray detector 20 can be simplified.

Moreover, since the semiconductor switching elements 24 are constituted from the gate electrodes 241, the second insulating film 29 functioning as the gate insulating film and the semiconductor element substrates 242, respectively, which are subsequently formed on the X-ray incident surface 21A of the semiconductor substrate 21, the semiconductor switching elements 24 can be simplified so that the manufacturing cost of the X-ray detector 20 can be reduced.

Furthermore, since the condensers 25 are constituted from the stacking structure of the first metallic films 251/the first insulating film 28/the second metallic film 252 which are subsequently formed on the X-ray incident surface 21A of the semiconductor substrate 21, the condenser function can be simply imparted to the X-ray detector 20.

In this embodiment, the pixel electrodes 22 and the first metallic films 251 of the condensers 25 are formed on the X-ray incident surface 21A of the semiconductor substrate 21 so that the surface level of the pixel electrodes 22 are set equal to the surface level of the first metallic films 251. Also, the second metallic films 252 of the condensers 25 and the gate electrodes 241 of the semiconductor switching elements 24 are formed on the first insulating film 28 so that the surface level of the second metallic films 252 are set equal to the surface level of the gate electrodes 241. Therefore, the pixel electrodes 22 and the first metallic films 251 can be formed at the same manufacturing step and the second metallic films 252 and the gate electrodes 241 can be formed at the same manufacturing step so that the manufacturing process of the X-ray detector 20 can be simplified and the manufacturing cost of the X-ray detector 20 can be reduced.

Moreover, in this embodiment, since the semiconductor switching elements 24 are located between the semiconductor substrate 21 and the collimators 26, the semiconductor switching elements 24 can be shielded by the collimators 26 against the X-ray incident onto the semiconductor substrate 21. As a result, no charged particle is generated in the semiconductor switching elements 24 and thus, no leak current is generated in the semiconductor switching elements 24 so that the spatial resolution of the X-ray detector 20 can not be degraded due to the detection of leak current at the pixel electrodes 22.

The irradiation area of the X-ray can be changed by the collimators 26 so that the selectivity of X-ray irradiation can be imparted to the pixel electrodes 22. Namely, the pixel electrodes 22 for the X-ray to be irradiated can be appropriately selected.

Herein, in the case that the charged particles are detected at the pixel electrodes 22, a predetermined biasing voltage is applied between the pixel electrodes 22 and the platy electrode 23.

Third Embodiment

Figure 7:
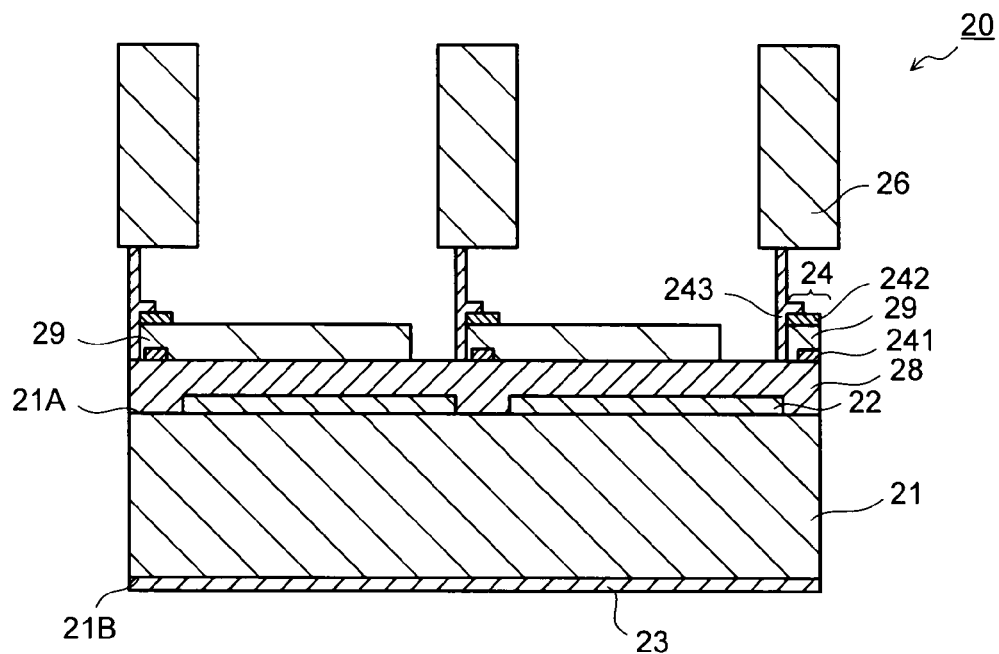
FIG. 7 is a cross sectional view showing an X-ray detector according to a third embodiment.

FIG. 7 is a schematic structural view showing an X-ray detector according to a third embodiment. This embodiment is an embodiment modified from the second embodiment and FIG. 7 corresponds to FIG. 5 in the second embodiment.

The X-ray detector 20 in this embodiment is configured similar to the X-ray detector 20 in the second embodiment except that bumps 243 are formed for the semiconductor switching elements 24, respectively, so that the semiconductor switching elements 24 are electrically connected with the collimators 26 via the bumps 243, respectively, as shown in FIG. 7. In this point of view, the distinctive feature of this embodiment will be described in detail and the similar features thereof will not be described.

As shown in FIG. 7, in this embodiment, the second insulating film 29 are etched in the thickness direction thereof so as to form depressed portions at the sides of the semiconductor switching elements 24, respectively. Then, the bumps 243 are formed in the depressed portions so as to be electrically connected with the semiconductor element substrates 242 of the semiconductor switching elements 24, respectively. The bumps 243 are also connected with the collimators 26. Therefore, the charged particles detected at the pixel electrodes 22 are charged in the corresponding condensers 25, and flowed into the corresponding collimators 26 via the corresponding bumps 243 by switching the corresponding semiconductor switching elements 24 on (applying predetermined voltages to the corresponding gate electrodes 241). In this point of view, the collimators 26 can function as signal wires.

The line width of a normal signal wire is in the order of several ten μm and the width of the collimator 26 is in the order of several hundred μm. Therefore, the resistance of the collimator 26 becomes remarkably small in comparison with the resistance of the normal signal wire. In this point of view, if the collimators 26 are employed as signal wires of the signal reading circuit, the degradation of the detection signal can be suppressed.

Since the other components of the X-ray detector 20 in this embodiment can be configured in the same manner as the ones in the second embodiment, the X-ray detector 20 in this embodiment can be exhibit the same function/effect as the one in the second embodiment.

Fourth Embodiment

Figure 8:
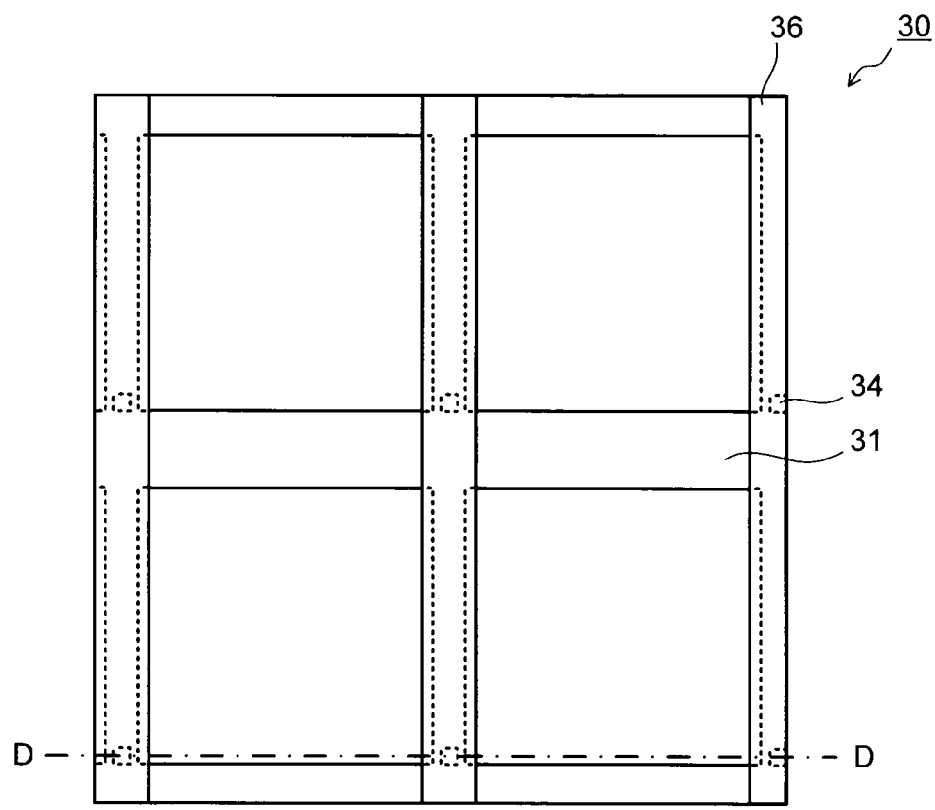
FIG. 8 is a plan view showing an X-ray detector according to a fourth embodiment.
Figure 9:
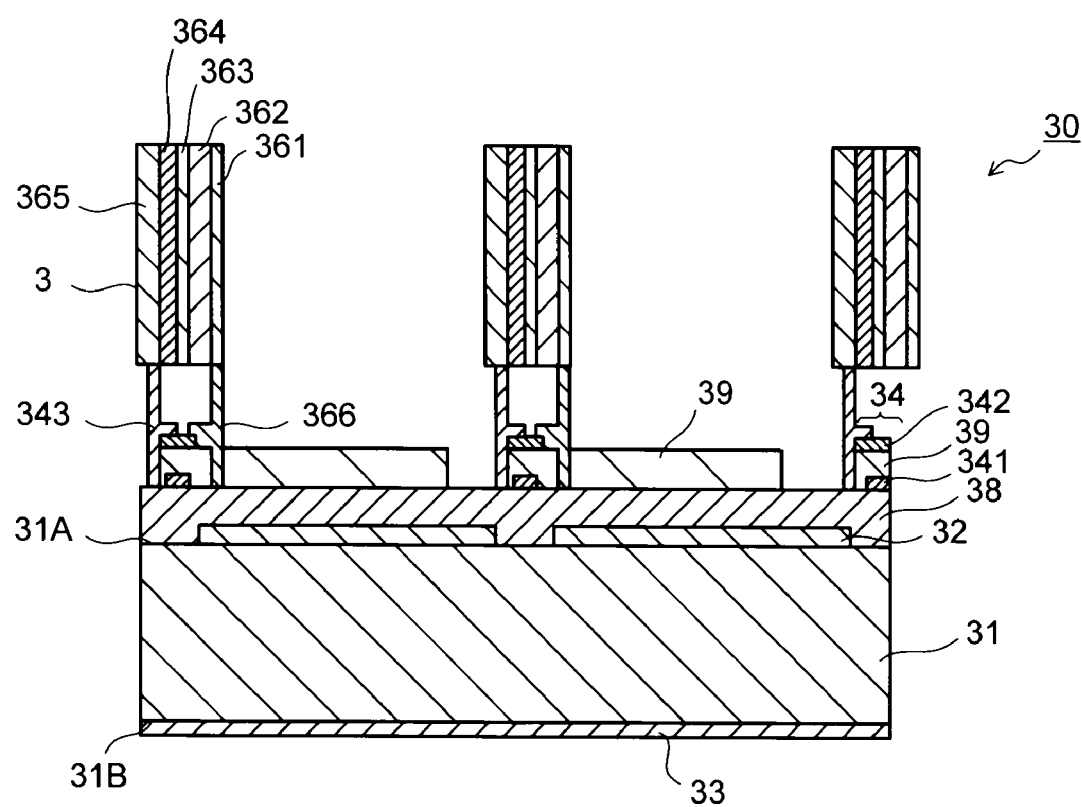
FIG. 9 is a cross sectional view of the X-ray detector in FIG. 8, taken on line D-D thereof.

FIGS. 8 and 9 are schematic structural views showing an X-ray detector according to a fourth embodiment. FIG. 8 is a plan view showing the X-ray detector in this embodiment, and FIG. 9 is a cross sectional view showing the X-ray detector in this embodiment, taken on line D-D thereof. For clarifying the distinctive feature of the X-ray detector in this embodiment, attention is paid to a portion of the X-ray detector in FIGS. 8 and 9 and the sizes of the components of the X-ray detector shown in FIG. 8 are different from the sizes of the components of the X-ray detector shown in FIG. 9.

As shown in FIGS. 8 and 9, the X-ray detector 30 in this embodiment includes a semiconductor substrate 31, a plurality of pixel electrodes 32 arranged in matrix on the X-ray incident surface 31A of the semiconductor substrate 31 and a platy electrode 33 provided on the rear surface 31B of the semiconductor substrate 31 opposite to the X-ray incident surface 31A thereof. A plurality of collimators 36 are disposed above the X-ray incident surface 31A and located between the adjacent pixel electrodes 32.

Then, a first insulating film 38 and a second insulating film 39 are subsequently formed on the X-ray incident surface 31A of the semiconductor substrate 31 so as to cover the pixel electrodes 32.

As shown in FIG. 9, a plurality of gate electrodes 341 are formed on the first insulating film 38 and a plurality of semiconductor element substrates 342 are formed on the second insulating film 39. In this case, portions of the second insulating film 39 located between the gate electrodes 341 and the semiconductor element substrates 342 function as gate insulating films. Therefore, the combinations of the gate electrodes 341, the second insulating film 39 and the semiconductor element substrates 342 constitute transistors as semiconductor switching elements 34 respectively. As apparent from FIGS. 8 and 9, in this embodiment, the semiconductor switching element 34 is provided per pixel electrode 32.

As shown in FIG. 9, a first collimator metallic film 361, a first collimator insulating film 362, a second collimator metallic film 363, a second collimator insulating film 364 and a third collimator metallic film 365 are subsequently formed in each of the collimators 36.

In each of the collimators 36, the first collimator metallic film 361, the first collimator insulating film 362, the second collimator metallic film 363 constitute a condenser, and the second collimator insulating film 364 and the third collimator metallic film 365 constitute a signal wire. The first collimator metallic film 361 is electrically connected with the pixel electrode 32 via the bump 366. The third collimator metallic film 365 is electrically connected with the semiconductor switching element 34 via the bump 343.

The bumps 366 and 343 are formed so as to be electrically connected with the semiconductor element substrate 342 of the semiconductor switching element 34.

The condenser is formed per pixel electrode. In this case, the third collimator metallic film 365 is formed continuously in each of the collimators 36 so as to constitute the signal wire, but the first collimator metallic film 361, the first collimator insulating film 362 and the second collimator metallic film 363 are divided in each of the collimators 36 per pixel electrode so as to constitute the condensers of the corresponding pixel electrodes 32.

The semiconductor substrate 31 is made of a semiconductor material with high X-ray absorbency such as CdTe, amorphous Se, $PbI_2$ and PbO. The pixel electrodes 32 and the platy electrode 33 are made of an electrode material commercially available such as Au, Pt, Al and In.

When an X-ray is incident onto the X-ray incident surface 31A of the semiconductor substrate 31, the X-ray excites the semiconductor elements of the semiconductor substrate 31 to generate charged particles (electrons and holes) in the semiconductor substrate 31. In this case, as shown in FIG. 3, the concentration of the charged particles becomes higher near the X-ray incident surface 31A and becomes lower near the rear surface 31B because the concentration of the charged particles is decreased remarkably in the thickness direction (toward the rear surface 31B from the X-ray incident surface 31A of the semiconductor substrate 31).

In this embodiment, since the pixel electrodes 32 are provided on the X-ray incident surface 31A of the semiconductor substrate 31, that is, at the incident side of the X-ray, the charged particles generated at the incident side of the X-ray, that is, on the X-ray incident surface 31A can be detected effectively and efficiently by the irradiation of the X-ray. Moreover, since the charged particles are detected at the incident side of the X-ray by the pixel electrodes 32, the detection of the charged particles can not be affected by the lateral diffusion of the charged particles accompanied by the longitudinal direction of the charged particles along the thickness direction of the semiconductor substrate 31. Therefore, since the pixel electrodes 32 can detect the charged particles only generated at the corresponding incident position of the X-ray of the semiconductor substrate 31, the spatial resolution of the X-ray detector 30 can be enhanced. In contrast, in a conventional X-ray detector 30, since the pixel electrodes 32 are provided on the rear surface 32B of the semiconductor substrate 32, the detection of the charged particles by the pixel electrodes 32 is affected by the lateral diffusion of the charged particles.

In this embodiment, since the condenser is provided per pixel electrode 32, the charged particles detected at the pixel electrode 32 is charged in the corresponding condenser. Concretely, the charged particles are charged in the corresponding condenser made of the first collimator metallic film 361, the first collimator insulating film 362 and the second collimator metallic film 363 in the corresponding collimator 36 via the corresponding bump 366.

Thereafter, the corresponding semiconductor switching element 34 is switched on (a predetermined gate voltage is applied to the corresponding gate electrode 341) so that the charged particles charged in the corresponding condenser are introduced into the corresponding third collimator metallic film 365 forming the signal wire in the corresponding collimator 36 via the corresponding bumps 366 and 343 and read out. Therefore, the pixel electrodes 32, the semiconductor switching elements 34, the bumps 366, 343, the first collimator metallic films 361, the first collimator insulating films 362, the second collimator metallic film 363s and the third collimator metallic films 365 constitute a signal reading circuit.

In this point of view, the X-ray detector 30 in this embodiment does not require an external reading circuit so that the entire structure of the X-ray detecting device containing the X-ray detector 30 can be simplified.

Moreover, since the condensers are provided in the collimators 36, the condenser function can be simply imparted to the X-ray detector 30. Furthermore, since no condenser is provided on the semiconductor substrate 31, the pixel electrodes 33 can be arranged on the semiconductor substrate 31 in high density so that the spatial resolution of the X-ray detector 30 can be much enhanced.

In this embodiment, the third collimator metallic films 365 of the collimators 36 functions as signal wires, respectively. The line width of a normal signal wire is in the order of several ten μm and the width of the third collimator metallic film 365 of the collimator 36 is in the order of several hundred μm. Therefore, the resistance of the third collimator metallic film 365 becomes remarkably small in comparison with the resistance of the normal signal wire. In this point of view, if the third collimator metallic films 365 are employed as the signal wires of the signal reading circuit, the degradation of the detection signal can be suppressed.

Then, since the semiconductor switching elements 34 are configured so as to contain the gate electrodes 341, the second insulating film 39 functioning as the gate insulating films and the semiconductor element substrates 342, respectively, which are subsequently formed on the X-ray incident surface 31A of the semiconductor substrate 31, the structures of the semiconductor switching elements 24 can be simplified so that the manufacturing cost of the X-ray detector 30 can be reduced.

In this embodiment, since the semiconductor switching elements 34 are located between the semiconductor substrate 31 and the collimators 36, the semiconductor switching elements 34 can be shielded by the collimators 36 against the X-ray incident onto the semiconductor substrate 31. As a result, no charged particle is generated in the semiconductor switching elements 34 and thus, no leak current is generated in the semiconductor switching elements 34 so that the spatial resolution of the X-ray detector 30 can not be degraded due to the detection of leak current at the pixel electrodes 32.

The irradiation area of the X-ray can be changed by the collimators 36 so that the selectivity of X-ray irradiation can be imparted to the pixel electrodes 32. Namely, the pixel electrodes 32 for the X-ray to be irradiated can be appropriately selected.

Although the present invention was described in detail with reference to the above examples, this invention is not limited to the above disclosure and every kind of variation and modification may be made without departing from the scope of the present invention.

What is claimed is:

1. An X-ray detector, comprising:
   a semiconductor substrate to generate charged particles by an irradiation of an X-ray;
   a plurality of pixel electrodes arranged in matrix on an X-ray incident surface of said semiconductor substrate and applied with a first electric potential to detect said charged particles;
   a platy electrode provided on a surface opposite to said X-ray incident surface of said semiconductor substrate and applied with a second electric potential different from said first electric potential;
   a plurality of condensers electrically connected with said plurality of pixel electrodes, respectively; and
   a plurality of semiconductor switching elements electrically connected with said plurality of condensers, respectively.

2. The X-ray detector as set forth in claim 1, further comprising,
   a plurality of collimators above said X-ray incident surface of said semiconductor substrate between adjacent ones of said plurality of pixel electrodes.

3. The X-ray detector as set forth in claim 2,
   wherein each of said plurality of collimators contains a stacking structure of a first metallic film/an insulating film/a second metallic film to constitute each of said plurality of condensers so that said plurality of condensers are contained in said plurality of collimators, respectively.

4. The X-ray detector as set forth in claim 3,
   wherein each of said semiconductor switching elements contains a semiconductor element substrate, a gate insulating film and a gate electrode which are formed on said X-ray incident surface of said semiconductor substrate.

5. The X-ray detector as set forth in claim 3,
   wherein each of said plurality of collimators contains a third metallic film adjacent to said stacking structure via an additional insulating film so that said third metallic film functions as a signal wire of each of said plurality of said semiconductor switching elements.

6. The X-ray detector as set forth in claim 5,
   wherein said stacking structure is divided per pixel electrode to constitute said condenser per pixel electrode while said third metallic film is elongated across said pixel electrodes.

7. The X-ray detector as set forth in claim 2,
   wherein said plurality of semiconductor switching elements are arranged between said semiconductor substrate and said plurality of collimators.

8. The X-ray detector as set forth in claim 2,
   wherein said plurality of semiconductor switching elements are electrically connected with said plurality of collimators, respectively so that said plurality of collimators function as signal wires for said plurality of said semiconductor switching elements.

9. The X-ray detector as set forth in claim 1,
   wherein each of said plurality of condensers is made of a stacking structure of a first metallic film/an insulating film/a second metallic film which are formed on said X-ray incident surface of said semiconductor substrate.

10. The X-ray detector as set forth in claim 1,
    wherein each of said semiconductor switching elements contains a semiconductor element substrate, a gate insulating film and a gate electrode which are formed on said X-ray incident surface of said semiconductor substrate.

11. The X-ray detector as set forth in claim 10,
    wherein said gate electrode is located below said gate insulating film and said semiconductor element substrate is located above said gate insulating film.

12. The X-ray detector as set forth in claim 10,
    wherein each of said plurality of collimators contains a stacking structure of a first metallic film/an insulating film/a second metallic film, and
    wherein a surface level of one of said first metallic film and said second metallic film of said condenser is set equal to a surface level of said gate electrode of said semiconductor switching element.

13. The X-ray detector as set forth in claim 12,
    wherein a surface level of the other of said first metallic film and said second metallic film of said condenser is set equal to a surface level of each of said plurality of pixel electrodes.

14. The X-ray detector as set forth in claim 1,
    wherein said semiconductor substrate is made of at least one selected from the group consisting of CdTe, amorphous Se, $PbI_2$ and PbO.

* * * * *